(12) United States Patent
Sugimura et al.

(10) Patent No.: US 9,223,670 B2
(45) Date of Patent: Dec. 29, 2015

(54) TEST APPARATUS AND TEST MODULE

(75) Inventors: Hajime Sugimura, Saitama (JP);
Takeshi Yaguchi, Saitama (JP);
Takahiro Nakajima, Gunma (JP)

(73) Assignee: ADVANTEST CORPORATION, Tokyo (JP)

(*) Notice: Subject to any disclaimer, the term of this patent is extended or adjusted under 35 U.S.C. 154(b) by 811 days.

(21) Appl. No.: 13/427,909

(22) Filed: Mar. 23, 2012

(65) Prior Publication Data
US 2013/0231887 A1   Sep. 5, 2013

(30) Foreign Application Priority Data
Mar. 1, 2012   (JP) .................................. 2012-045890

(51) Int. Cl.
*G06F 11/273*   (2006.01)

(52) U.S. Cl.
CPC .................................. *G06F 11/273* (2013.01)

(58) Field of Classification Search
CPC .............. G06F 11/273; G01R 31/3193; G01R 31/3187
USPC ........................................................ 702/122
See application file for complete search history.

(56) References Cited

U.S. PATENT DOCUMENTS

| | | | |
|---|---|---|---|
| 5,604,756 A * | 2/1997 | Kawata | 714/773 |
| 6,732,053 B1 * | 5/2004 | Aragona | 702/22 |
| 2007/0132477 A1 * | 6/2007 | Balog et al. | 324/765 |
| 2008/0221824 A1 | 9/2008 | Kumaki | |
| 2011/0015890 A1 | 1/2011 | Yamashita et al. | |
| 2011/0057673 A1 * | 3/2011 | Iwamoto et al. | G01R 31/3193 324/750.3 |

FOREIGN PATENT DOCUMENTS

| | | |
|---|---|---|
| JP | 2007-157264 A | 6/2007 |
| JP | 2011-065587 A | 3/2011 |
| JP | 2011-154025 A | 8/2011 |
| WO | 2011/001462 A1 | 1/2011 |

OTHER PUBLICATIONS

Office Action issued for counterpart Japanese Application 2012-045890, issued by the Japanese Patent Office on Mar. 17, 2015.

* cited by examiner

*Primary Examiner* — Mischita Henson

(57) ABSTRACT

A test apparatus that tests a device under test, comprising a control apparatus sequentially executing a plurality of test programs and controlling testing of the device under test; and a test module controlled by the control apparatus to test the device under test by communicating with the device under test and to transmit a test result of each test program to the control apparatus. The test module includes memories that store the test results of the test programs, and starts a subsequent test such that at least a portion of a result processing time period of a current test, from when a test result stored in a first memory begins being transmitted to the control apparatus to when processing of the test result by the control apparatus ends, overlaps with at least a portion of a test execution period in which the subsequent test is executed using a second memory.

16 Claims, 15 Drawing Sheets

| ENTRY NUMBER | SITE NUMBER | CONTEXT NUMBER |
| --- | --- | --- |
| 1 | 1 | 1 |
| 2 | 2 | 1 |
| 3 | 1 | 2 |
| 4 | 0 | 0 |
| 5 | 0 | 0 |
| 6 | 0 | 0 |
| 7 | 0 | 0 |
| 8 | 0 | 0 |
| 9 | 0 | 0 |
| a | 0 | 0 |
| b | 0 | 0 |
| c | 0 | 0 |
| d | 0 | 0 |
| e | 0 | 0 |
| f | 0 | 0 |

FIG. 8

| SITE NUMBER | CONTEXT NUMBER | MODULE NUMBER | R/W | LOGICAL ADDRESS | DATA | BANK SWITCHING SIGNAL |
|---|---|---|---|---|---|---|

| TEST TARGET | $\begin{pmatrix} \text{PHYSICAL PIN} \\ \text{NUMBER} \end{pmatrix}$ 1     9    PHYSICAL ADDRESS    17     25 |
|---|---|
| FIRST DUT | 1111111100000000000000000000000 |
| SECOND DUT | 0000000011111111000000000000000 |
| FIRST AND THIRD DUTS | 1111111100000000111111110000000 |
| FIRST TO FOURTH DUTS | 1111111111111111111111111111111 |

TEST APPARATUS AND TEST MODULE

BACKGROUND

1. Technical Field

The present invention relates to a test apparatus and a test module.

2. Related Art

A test apparatus that tests a device under test (DUT) includes one or more test modules. Each of the one or more test modules includes a plurality of testing sections. Each testing section is connected to a terminal of the DUT via a transmission line, and tests the DUT by exchanging signals with the DUT.

Furthermore, the test apparatus includes a site controller (control apparatus) that controls the test modules. The control apparatus executes a test program to control operation of the testing sections connected to the DUT.

Patent Document 1: Japanese Patent Application Publication No. 2011-154025

Patent Document 2: International Publication WO 2011/001462

When a plurality of test items are performed in series on a device under test, prescribed test modules or testing sections may operate to perform each test item in series. For example, when performing a series of test items using an analog signal on a device under test, test modules or testing sections corresponding to an analog signal may operate in series.

When the prescribed test modules and testing sections operate in series for the plurality of test items, the control apparatus receives test results from the test modules or testing sections and executes the test program for the next test item after the computation process or the like for the test results is completed. Therefore, the testing time is increased.

SUMMARY

Therefore, it is an object of an aspect of the innovations herein to provide a test apparatus and a test module, which are capable of overcoming the above drawbacks accompanying the related art. The above and other objects can be achieved by combinations described in the independent claims. The dependent claims define further advantageous and exemplary combinations of the innovations herein. According to a first aspect related to the innovations herein, provided is a test apparatus that tests a device under test, comprising a control apparatus that sequentially executes a plurality of test programs and controls testing of the device under test; and a test module that is controlled by the control apparatus to test the device under test by communicating with the device under test and to transmit a test result of each test program to the control apparatus. The test module includes a plurality of memories that store the test results of the test programs, and starts a subsequent test such that at least a portion of a result processing time period of a current test, which is from when a test result stored in a first memory begins to be transmitted to the control apparatus to when processing of the test result by the control apparatus is finished, overlaps with at least a portion of a test execution period in which the subsequent test is executed using a second memory.

The summary clause does not necessarily describe all necessary features of the embodiments of the present invention. The present invention may also be a sub-combination of the features described above.

BRIEF DESCRIPTION OF THE DRAWINGS

FIG. 8 shows exemplary identification information stored in an assignment storage section 62.

FIG. 11 shows an exemplary format of the command transmitted from the control apparatus 18 to the test module 20.

FIG. 14 shows exemplary candidates for a physical address identifying DUTs 300 to be test targets, stored in the DUT map table 68.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
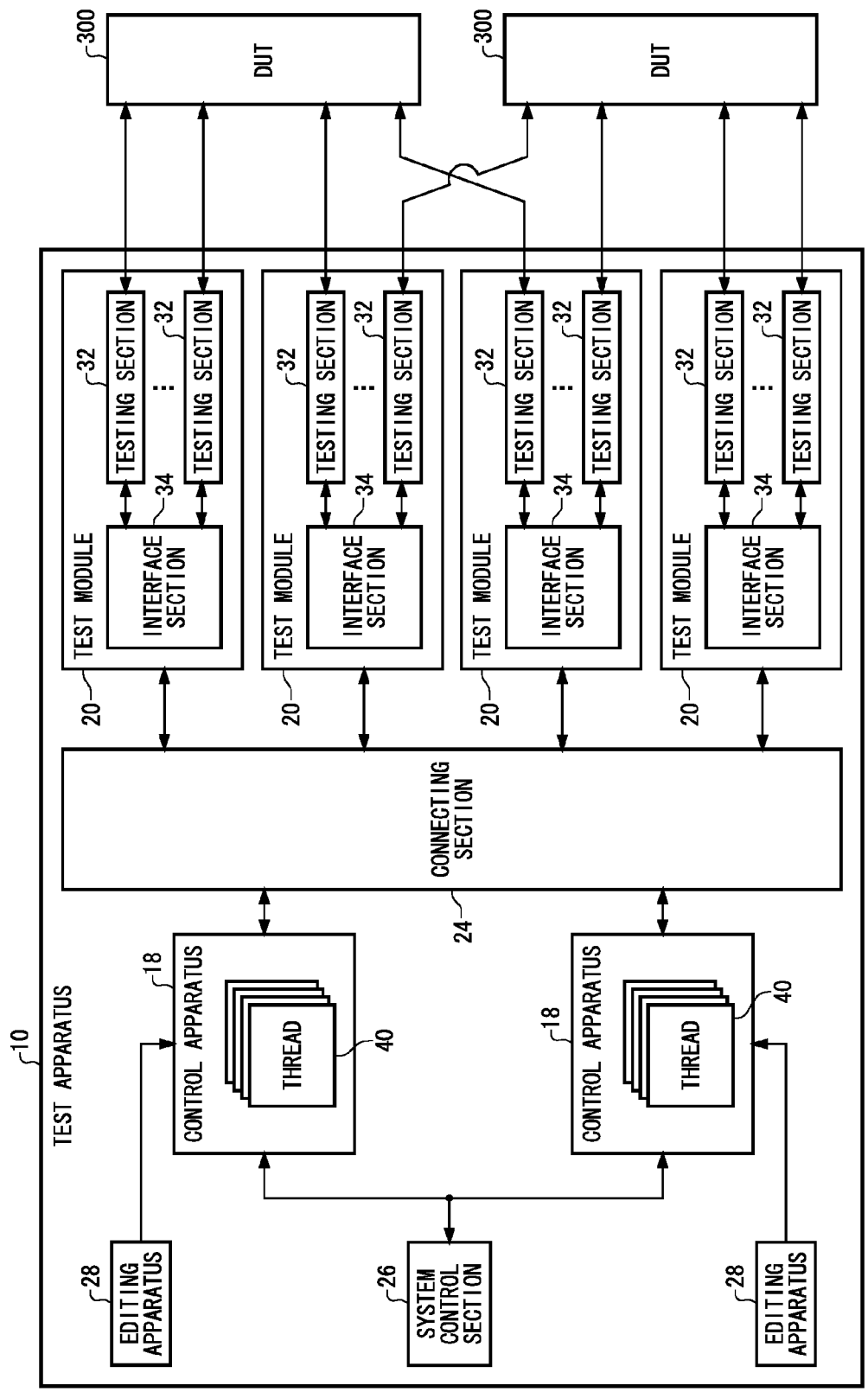
FIG. 1 shows a configuration of a test apparatus 10 according to an embodiment of the present invention, along with a plurality of DUTs 300.

FIG. 1 shows a configuration of a test apparatus 10 according to an embodiment of the present invention, along with a plurality of DUTs 300. The test apparatus 10 of the present embodiment tests at least one device under test (DUT) 300.

For example, the test apparatus 10 may sequentially test one DUT 300 at a time. The test apparatus 10 may test the DUTs 300 one at a time in a continuous series, or may test the DUTs 300 one at a time in an interrupted series.

The test apparatus 10 includes a plurality of control apparatuses 18, a plurality of test modules 20, a connecting section 24, a system control section 26, and a plurality of editing apparatuses 28. If only one type of DUT 300 is being tested, the test apparatus 10 may include one control apparatus 18 instead of a plurality of control apparatuses 18.

Each control apparatus 18 executes a test program to test the corresponding DUT 300. Each control apparatus 18 corresponds to a type of DUT 300. The control apparatuses 18 sequentially execute a plurality of threads 40. Each control apparatus 18 executes one thread 40 in association with one test program. Accordingly, each control apparatus 18 can sequentially execute a plurality of test programs by executing a plurality of the threads 40.

Each test module 20 is a substrate attached within a test head, for example. Each test module 20 includes a plurality of testing sections 32 and an interface section 34.

Each testing section 32 is connected to a terminal of one of the DUTs 300. Each testing section 32 tests the DUT 300 by exchanging signals with the terminal of the DUT 300 to which the testing section 32 is connected.

Each testing section 32 is assigned to one of the threads 40 of one of the control apparatuses 18. This assignment is sequentially changed according to the sequential execution of the threads 40. Each testing section 32 performs a corresponding test according to the assigned thread 40. Each testing section 32 is connected to the DUT 300 corresponding to the control apparatus 18 to which the testing section 32 is assigned. In other words, each testing section 32 is controlled by the test program corresponding to the thread 40 of the control apparatus 18 to which the testing section 32 is assigned, and tests the DUT 300 corresponding to the control apparatus 18 by exchanging signals with the DUT 300.

The testing sections 32 within a single test module 20 may include testing sections 32 attached to a first DUT 300 and testing sections 32 attached to a second DUT 300, and may further include testing sections 32 connected to other DUTs 300. Furthermore, each DUT 300 may be connected to a different test module 20.

Each interface section 34 receives a command signal from the corresponding control apparatus 18. The interface section 34 accesses the testing section 32 assigned to a thread 40 of the control apparatus 18 that sent the command, in response to the received command. More specifically, upon receiving the command, the interface section 34 writes the data contained in the command to an internal register of a testing section 32 designated by the command. The testing section 32 performs an operation corresponding to the written data, in response to having data written to an internal register thereof.

When a read command is received, the interface section 34 reads data from the internal register of the testing section 32 designated by the command. The interface section 34 transmits a message including the read data to the thread 40 of the control apparatus 18 that was the source of the command transmission.

The connecting section 24 connects the control apparatuses 18 to the test modules 20. For example, the connecting section 24 may be a switch controller that switches the connections between the control apparatuses 18 and the test modules 20.

The system control section 26 is connected to each of the control apparatuses 18, and controls the overall test apparatus 10. A universal or specialized high-speed serial bus, for example, may be used to connect the system control section 26 to the control apparatuses 18.

Each editing apparatus 28 corresponds to a control apparatus 18. Each editing apparatus 28 enables a user to edit the test programs executed by the corresponding control apparatus 18. Each editing apparatus 28 may enable the user to edit the execution order of the test programs executed by the control apparatus 18, for example.

The control apparatuses 18 sequentially execute the test programs for testing the DUTs 300, in order to sequentially control the operation of the testing sections 32 assigned to the respective test programs. More specifically, each control apparatus 18 sequentially executes a plurality of threads 40, to execute one test program corresponding to each of the threads 40. The testing sections 32 controlled by the control apparatuses 18 in this manner exchange signals in parallel with the DUTs 300 to test the DUTs 300.

In this case, each control apparatus 18 sequentially executes a plurality of test programs to perform testing independently of each other. In other words, each control apparatus 18 sequentially executes test programs for performing tests that do not depend on each other. Here, the control apparatuses 18 sequentially execute the test programs such that a portion of one test program overlaps with a portion of another test program that is to be executed next after the one test program (referred to in the Specification as "overlapping tests"). As a result, when a plurality of tests are performed on a DUT 300, the testing time can be decreased. The bus providing the connection between the test modules 20 and the control apparatuses 18 may be a bus that cannot transmit test results in parallel.

Each control apparatus 18 is capable of executing a test program managed by a different user, to control the operation of the testing sections 32 assigned thereto. Therefore, the test apparatus 10 enables the executed test programs to be edited for individual users via corresponding control apparatuses 18 using corresponding editing apparatuses 28.

Figure 2:
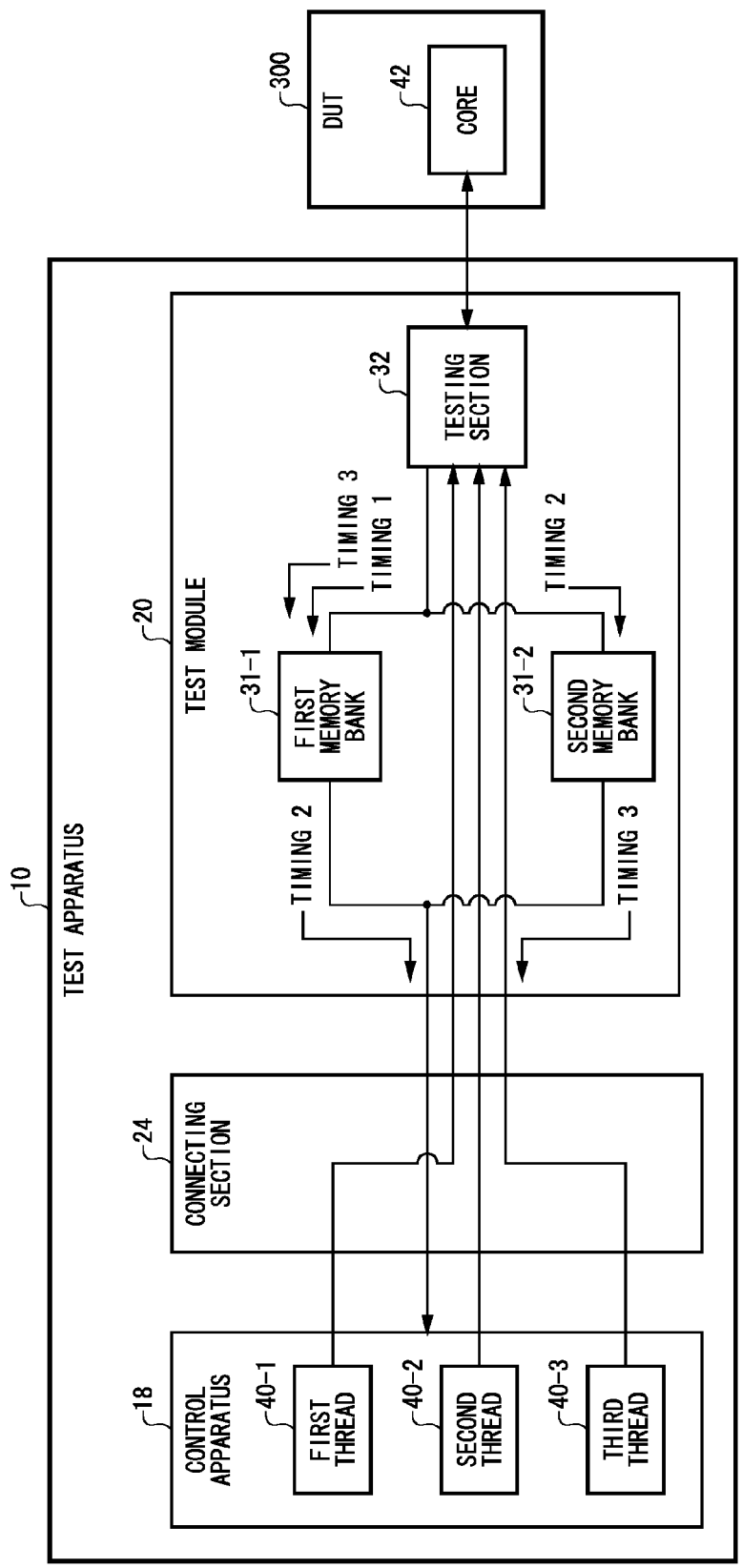
FIG. 2 shows an exemplary control flow within a test apparatus 10 and an exemplary signal flow between the test apparatus 10 and a DUT 300, when overlapping tests are executed.

FIG. 2 shows an exemplary control flow within a test apparatus 10 and an exemplary signal flow between the test apparatus 10 and a DUT 300, when overlapping tests are executed. In FIG. 2, the flow of signals for which at least a portion of the transmission time overlaps is represented by the same number "timing." In FIG. 2, the system control section 26, the editing apparatus 28, and the interface section 34 are not shown. In order to perform the overlapping tests, a user may prepare a test program that can execute overlapping tests. The initial conditions for each thread may be set in this test program.

The control apparatus 18 sequentially executes a first thread 40-1, a second thread 40-2, and a third thread 40-3 corresponding to a plurality of test programs. The control apparatus 18 controls testing of the DUT 300 by sequentially executing the test programs via the testing section 32.

The test module 20 is controlled by the control apparatus 18 to communicate with and test the DUT 300. The test module 20 transmits the test results of each test program, i.e. each thread 40, to the control apparatus 18. In other words, the test module 20 is controlled by the control apparatus 18 to execute the first thread 40-1 and test a core 42 of the DUT 300. Next, the test module 20 is controlled by the control apparatus 18 to sequentially test the core 42 of the DUT 300 by sequentially executing the second thread 40-2 and the third thread 40-3. Furthermore, the test module 20 transmits the test results of each test program to the control apparatus 18.

The test module 20 includes a first memory bank 31-1 and a second memory bank 31-2 as memories for storing the test results for each of the test programs. The testing section 32 tests the core 42 of the DUT 300 using the first thread 40-1, and stores these test results in the first memory bank 31-1 (timing 1). Next, the testing section 32 tests the core 42 of the DUT 300 using the second thread 40-2 and stores these test results in the second memory bank 31-2 (timing 2). While the testing section 32 tests the DUT 300 using the second thread 40-2 or stores the test results in the second memory bank 31-2, the test module 20 transmits the test results of the first thread 40-1 stored in the first memory bank 31-1 to the control apparatus (timing 2). Similarly, the testing section 32 tests the core 42 of the DUT 300 using the third thread 40-3 or stores the test results in the first memory bank 31-1 (timing 3). While the testing section 32 operates according to the third thread 40-3, the test module 20 transmits the test results of the second thread 40-2 stored in the second memory bank 31-2 to the control apparatus (timing 3).

In this example, the test module 20 tests the core 42 of the DUT 300, and stores the test results in the first memory bank 31-1 (or the second memory bank 31-2) while transmitting the immediately prior test results stored in the second memory bank 31-2 (or the first memory bank 31-1) to the control apparatus. As a result, the control apparatus 18 can overlap the time period from when testing is begun to when the test results have been stored with the time period from when the immediately prior test results are transmitted to the control apparatus to when the control apparatus 18 processes these test results. Accordingly, the testing time can be reduced.

Figure 3:
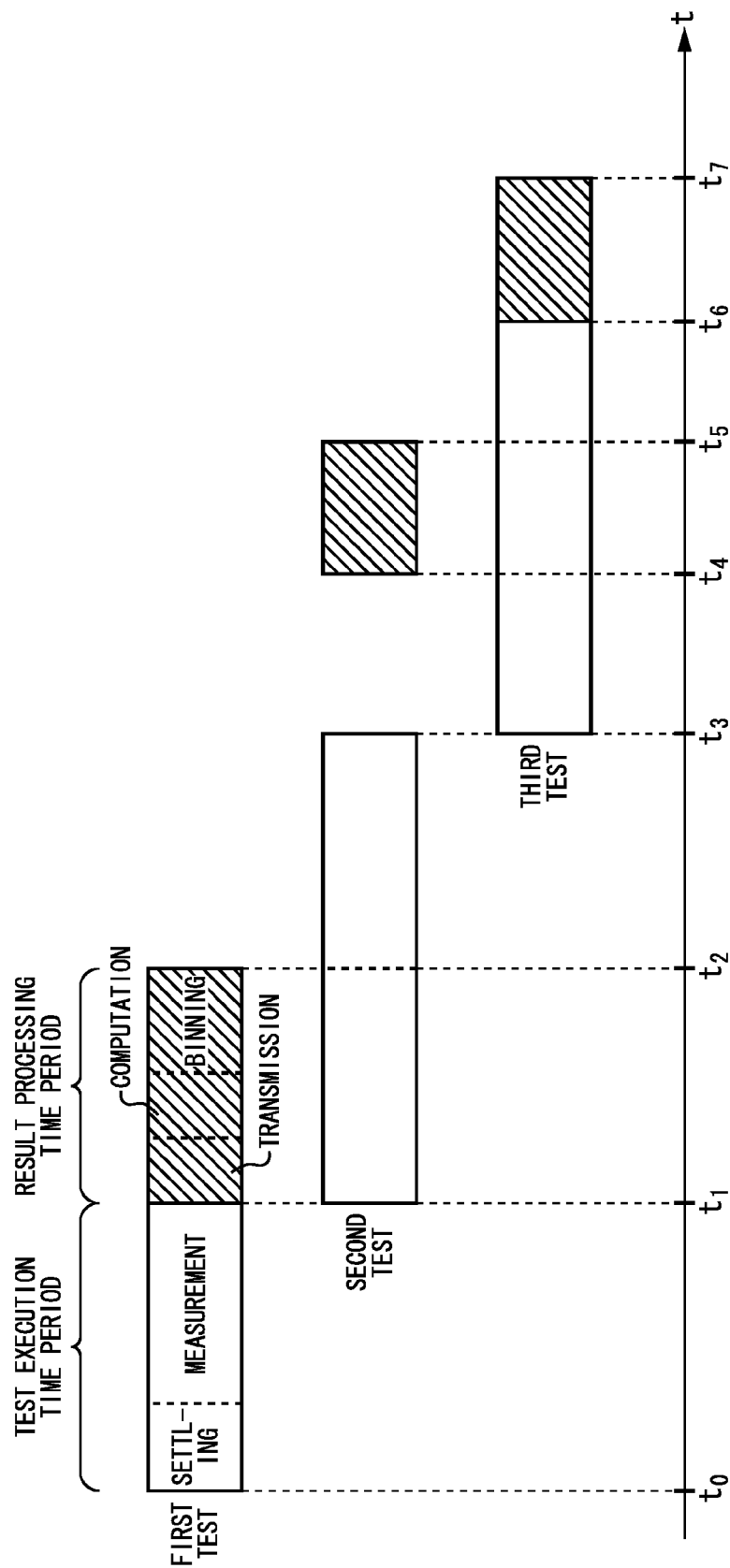
FIG. 3 shows an exemplary order of execution of the test programs when executing overlapping tests.

FIG. 3 shows an exemplary order of execution of the test programs when executing overlapping tests. The test apparatus 10 may execute the first thread 40-1 to the third thread 40-3 to respectively perform first to third tests on the DUT 300, for example. The first thread 40-1 to third thread 40-3 control the same testing section 32.

The first to third tests respectively designate the tests performed by the first thread 40-1 to the third thread 40-3. The first to third tests each have a test execution time period and a result processing time period. The test execution time period refers to the time period during which the testing section 32 operates to perform the test, e.g. the time period from a settling start timing of the testing section 32 to a measurement end timing. The "settling" may be the operation of performing setting of the testing section 32 for executing the test. Furthermore, "settling start" may refer to the timing at which the control apparatus 18 begins executing the thread 40 corresponding to the test. The "measurement" may refer to an operation of the testing section 32 measuring a signal from the DUT 300. The "measurement end" may refer to the timing at which the transmission of the test results from the testing section 32 to the memory bank 31 is finished. The "test execution time period" may refer to the time period from when the test is begun to when the test results have been stored in the memory bank 31.

The "result processing time period" may refer to a time period from when the test results stored in the memory bank 31 begin to be transmitted to the control apparatus 18 to when the control apparatus 18 finishes processing these test results. For example, the control apparatus 18 may perform a computational process on the received test results, and perform binning of the DUT 300 according to the computation results. The "binning" may refer to a process of classifying the DUT 300 according to the test results, performed by the control apparatus 18. For example, the control apparatus 18 may assign grades to the performance of the DUT 300, according to the test results.

The test module 20 may begin second test may be begun such that at least a portion of the result processing time period for the first test overlaps with at least a portion of the test execution time period of the subsequent second test, for example. In other words, the test module 20 and the control apparatus 18 can store the test results in the first memory bank 31-1 (or second memory bank 31-2) in the test execution time period of each test, and process the test results of the immediately prior test results via the first memory bank 31-1 (or second memory bank 31-2) in the test execution time period of the subsequent test. In this way, the test module 20 stores the test results corresponding to the sequentially executed test programs alternately between the first memory bank 31-1 and the second memory bank 31-2, for each test program.

In the example of FIG. 3, for the first test, the test module 20 starts settling at time $t_0$. The test module 20 ends the measurement at time $t_1$. In other words, the test execution time period is from $t_0$ to $t_1$. The test module 20 begins transmitting the test results from the memory bank 31 to the control apparatus 18 at time $t_1$. The control apparatus 18 performs a computation and binning process on the received test results, and ends this processing at time $t_2$. In other words, the result processing time period is from $t_1$ to $t_2$.

For the second test, the test module 20 begins the test execution time period between time $t_1$ and time $t_2$. The test module 20 in this example starts settling at time $t_1$. The test module 20 ends the measurement at time $t_3$. In other words, the test execution time period is from $t_1$ to $t_3$. With this process, the result processing time period of the first test and the test execution time period of the second test can be performed in parallel, thereby decreasing the testing time.

The start of the result processing time period of a test and the start of the test execution time period of the subsequent test need not be at the same time as the end of the test execution time period of the current test. For example, as shown in FIG. 3, the start of the result processing time period of the second test may be delayed, as long as this time period begins before the start of the result processing time period of the third test and after the end of the result processing time period of the second test. In this case, the test module 20 preferably operates such that the test execution time periods of the tests are in series. It should be noted that the operation of the test module 20 is not limited to arranging the test execution time periods of the tests in series. As long as a portion of the result processing time period of a previous test overlaps with a portion of the test execution time period of a subsequent test, the testing time can be decreased by an amount equal to this overlap.

In this way, by starting execution of a subsequent test using the first memory bank 31-1 in parallel with the start of transmission of the test results stored in the second memory bank 31-2 to the control apparatus 18, the test module 20 can cause the result processing time period of the first test to overlap with the test execution time period of the second test. In other words, overlapping processing is enabled by causing at least a portion of a process in the result processing time period of an immediately prior test to be performed temporally in parallel with at least a portion of a process in the test execution time period.

Figure 4:
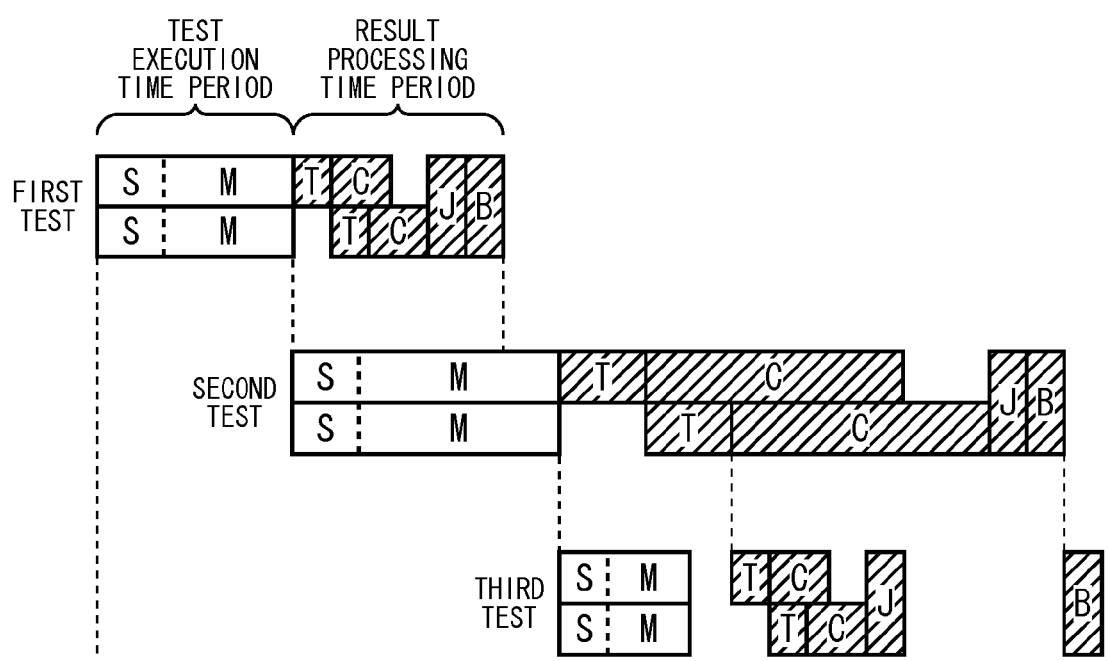
FIG. 4 shows another example of an execution order of the test programs when performing overlapping tests.

FIG. 4 shows another example of an execution order of the test programs when performing overlapping tests. The test apparatus 10 in this example sequentially executes three test programs to perform first to third tests. With the test apparatus 10 in this example, a settling process S and a measurement process M are performed as the processes of the test execution time period for each test. Furthermore, a transmission process T, a computation process C, a judging process J, and a binning process B are performed as the processes of the test result processing time period for each test. The judging process J may be a process to judge pass/fail of the DUT 300 based on the computation results of the computation process C. Furthermore, in each test, the test execution time periods of two threads 40 proceed in parallel to control a single testing section 32.

In this example, the transmission processes T of the test results to the control apparatus 18 are performed in a manner to not overlap. For example, when the transmission process T of the test results corresponding to one of the threads 40 in the first test is finished, the transmission process T of the test results corresponding to the other threads 40 in the first test may begin. Furthermore, while a first result process, e.g. the computation process C, is being performed on a first test result, if a second test result corresponding to another thread 40 or test is received, the control apparatus 18 may perform a second result process, e.g. the computation process C, on the second test result in parallel with the first result process.

The control apparatus 18 performs each test using the overlapping processes described in FIGS. 1 to 3. In this case, it is possible for the order in which each test is started and the order in which each test is ended to be reversed. For example, there may be a case, as shown by the second and third tests of FIG. 4, where the total of the test execution time period and the result processing time period of the third test is shorter than the result processing time period of the second test, and the end of a test started thereafter is earlier than the end of a test started prior thereto.

On the other hand, depending on the details of the test programs of the specifications of the test apparatus 10, for example, there are cases where it is necessary perform predetermined processes among the processes performed in the result processing time periods in the same order in which the tests are started. However, as described above, when the overlapping processing is performed, there are cases in which these predetermined processes cannot be performed in the order in which the tests are started.

The control apparatus 18 of the present embodiment records the execution order of a plurality of test programs, and executes at least a portion of the result processes to be performed in the result processing time periods in an order corresponding to the stored execution order. For example, the control apparatus 18 executes the final process to be executed last in each result process in an order corresponding to the order of execution of the corresponding test programs. In this example, among the result processes to be executed in the result processing time periods, the control apparatus 18 of the present embodiment executes the binning processes B, which are the final processes, in an order corresponding to the execution order of the test programs. For each test, the control apparatus 18 may detect whether the binning process B corresponding to the previous test has been completed, at a timing at which a process of the test other than the binning process B ends.

When the processes other than the final process (the transmission process T, the computation process C, and the judging process J in the present example) among the result processes of a test program to be started later are finished before the final process of a test program that was started earlier, the control apparatus 18 postpones the execution of the final process of the test program started later until the final process of the test program started earlier is finished. In the example of FIG. 4, at the time when the judging process J of the third test is finished, the binning process B of the second test is not yet finished, and therefore the control apparatus 18 postpones the execution of the binning process B of the third test. After the binning process B of the second test is finished, the control apparatus 18 performs the binning process B of the third test.

Figure 5:
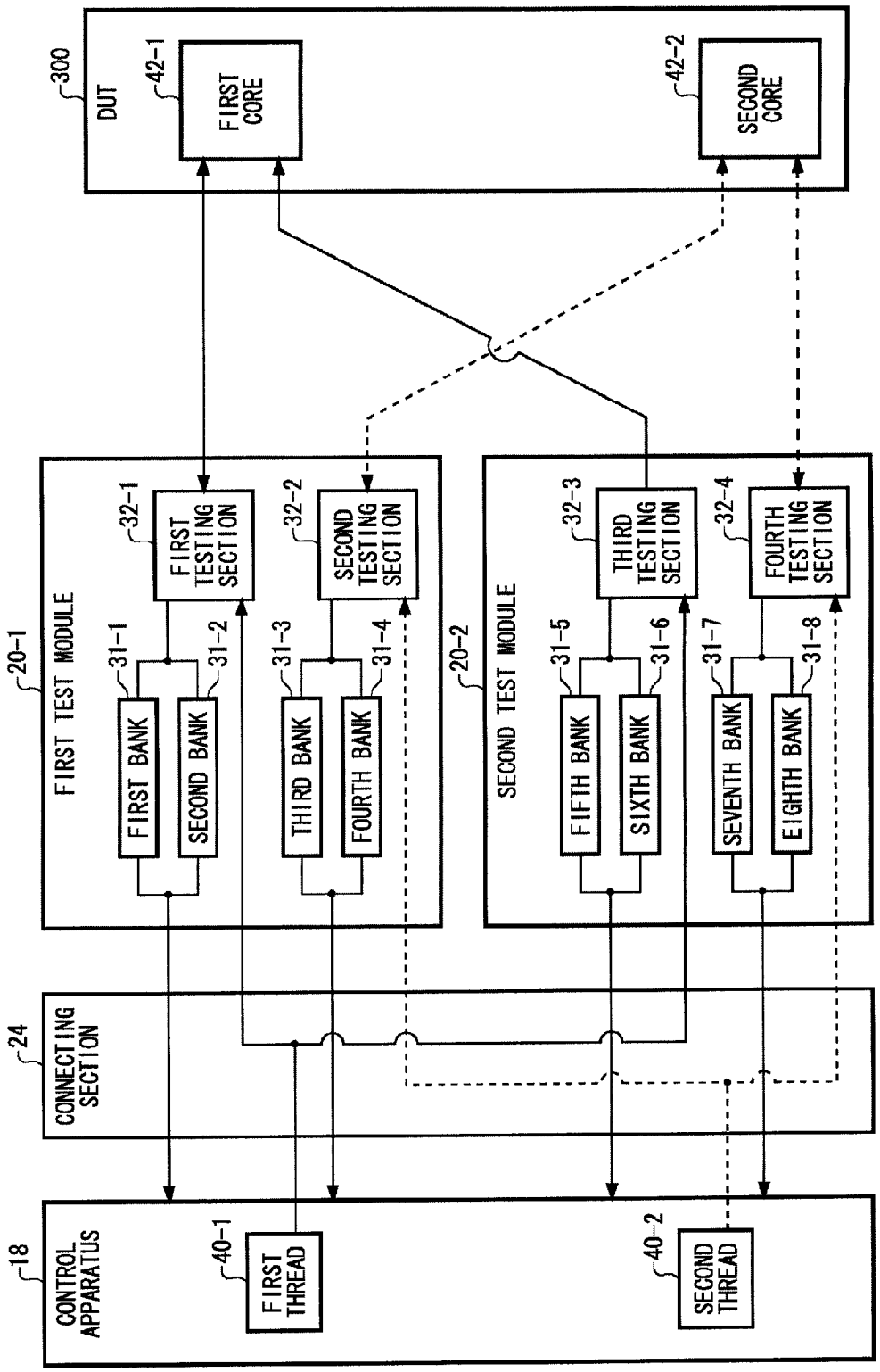
FIG. 5 shows an exemplary control flow in a test apparatus 10 and exemplary signal flow between the test apparatus 10 and two DUTs 300, when parallel testing is performed in parallel on DUTs 300 of the same type.

FIG. 5 shows an exemplary control flow in a test apparatus 10 and exemplary signal flow between the test apparatus 10 and two DUTs 300, when parallel testing is performed in parallel on DUTs 300 of the same type. In FIG. 5, the system control section 26, the editing apparatus 28, and the interface section 34 are not shown.

The overlapping tests can shorten the testing time when a plurality of threads 40 are executed in series by a single testing section 32. In contrast, testing may be performed by a plurality of testing sections 32 executing a plurality of threads 40 in parallel.

For example, when each of the threads 40 executes a prescribed test item, if the number of testing sections 32 that can execute a certain test item is greater than or equal to the number of corresponding threads 40, the test apparatus 10 uses a plurality of testing sections 32 to perform these threads 40 in parallel. Furthermore, if the number of testing sections 32 that can execute a certain test item is less than the number of corresponding threads 40, the test apparatus 10 uses the overlapping testing described above to execute at least two of these threads 40. A user preferably sets, in the test program, an indication of whether each thread 40 is to be executed using parallel testing or overlapping testing. As another example, the system control section 26 may make this determination based on configuration information for the testing sections 32 of the test apparatus 10 and the test programs provided by the user. In this case, information relating to the testing sections 32 that is necessary for executing the test items designated by the test programs may be stored in advance in the system control section 26.

The following describes the parallel testing. In this example, the test apparatus 10 may have the same configuration as the test apparatus 10 described in relation to FIGS. 1 to 3. In FIG. 4, among the overall configuration of the test apparatus 10, one control apparatus 18, the connecting section 24, a first test module 20-1, and a second test module 20-2 are shown. Furthermore, the interface sections 34 in the test modules 20 are not shown. The control apparatus 18 may test a first core 42-1 and a second core 42-2 of a DUT 300 at the same time, for example. In the present embodiment, the control apparatus 18 includes a first thread 40-1 and a second thread 40-2.

The first test module 20-1 includes a first testing section 32-1 and a second testing section 32-2, for example. The second test module 20-2 includes a third testing section 32-3 and a fourth testing section 32-4, for example.

The first testing section 32-1 and third testing section 32-3 are connected to the first core 42-1, and the second testing section 32-2 and fourth testing section 32-4 are connected to the second core 42-2.

In this example, the control apparatus 18 executes the first thread 40-1 and the second thread 40-2 in parallel. Furthermore, the control apparatus 18 assigns a single thread 40 to a plurality of testing sections 32. The control apparatus 18 assigns each thread 40 to testing sections 32 that are necessary for executing the test items of the thread 40. At this time, the control apparatus 18 may assign the two testing sections 32 included in a single test module 20 respectively to different threads 40. Furthermore, a plurality of testing sections 32 included in a single test module 20 may be assigned to the same thread 40. In this way, the resources of the test modules 20 can be used efficiently, and a plurality of threads 40 can be executed in parallel.

In the present embodiment, the control apparatus 18 assigns the first thread 40-1 to the first testing section 32-1 and the third testing section 32-3, and assigns the second thread 40-2 to the second testing section 32-2 and the fourth testing section 32-4. The control apparatus 18 transmits commands to the first testing section 32-1 through the fourth testing section 32-4, to control the operation thereof The first test module 20-1 executes the first thread 40-1, to test the first core 42-1 via the first testing section 32-1. The first test module 20-1 executes the second thread 40-2 to test the second core 42-2 via the second testing section 32-2. The second test module 20-2 executes the first thread 40-1 to test the first core 42-1 via the third testing section 32-3. The second test module 20-2 executes the second thread 40-2 to test the second core 42-2 via the fourth testing section 32-4.

In this way, the control apparatus 18 executes two threads 40 in parallel to test the core 42-1 and the core 42-2 of the DUT 300 in parallel, and can therefore control the operations of the plurality of testing sections 32 corresponding to the two threads 40 in parallel. The first test module 20-1 and the second test module 20-2 can test the first core 42-1 and the second core 42-2 in parallel.

The parallel testing can be combined with the overlapping testing. For example, after the first thread 40-1, the first testing section 32-1 may execute the third thread 40 in an overlapping manner. Furthermore, each testing section 32 has two memory banks 31 connected thereto. The testing sections 32 that do not perform overlapping testing store the test results in predetermined memory banks 31.

The first testing section 32-1 tests the first core 42-1 of the DUT 300 with the first thread 40-1. The first testing section 32-1 stores the test results in the first memory bank 31-1. When overlapping testing is performed, the first testing section 32-1 then tests the core 42 of the DUT 300 with the third thread 40, and stores these test results in the second memory bank 31-2. While testing the core 42 with the third thread 40 and storing the test results in the second memory bank 31-2, the first test module 20-1 transmits the test results of the first thread 40-1 stored in the first memory bank 31-1 to the control apparatus 18.

In the above example, the first testing section 32-1 performs overlapping testing by sequentially executing two threads 40. However, the first testing section 32-1 may perform overlapping testing by sequentially executing three or more threads 40. Furthermore, a plurality of testing sections 32 may perform overlapping testing in parallel.

In this way, parallel testing and overlapping testing can be performed in parallel. In other words, the test module 20 can perform tests of the same thread 40 in parallel for a plurality of testing sections 32, and can sequentially perform the tests of a plurality of threads 40 in an overlapping manner for a single testing section 32.

Figure 6:
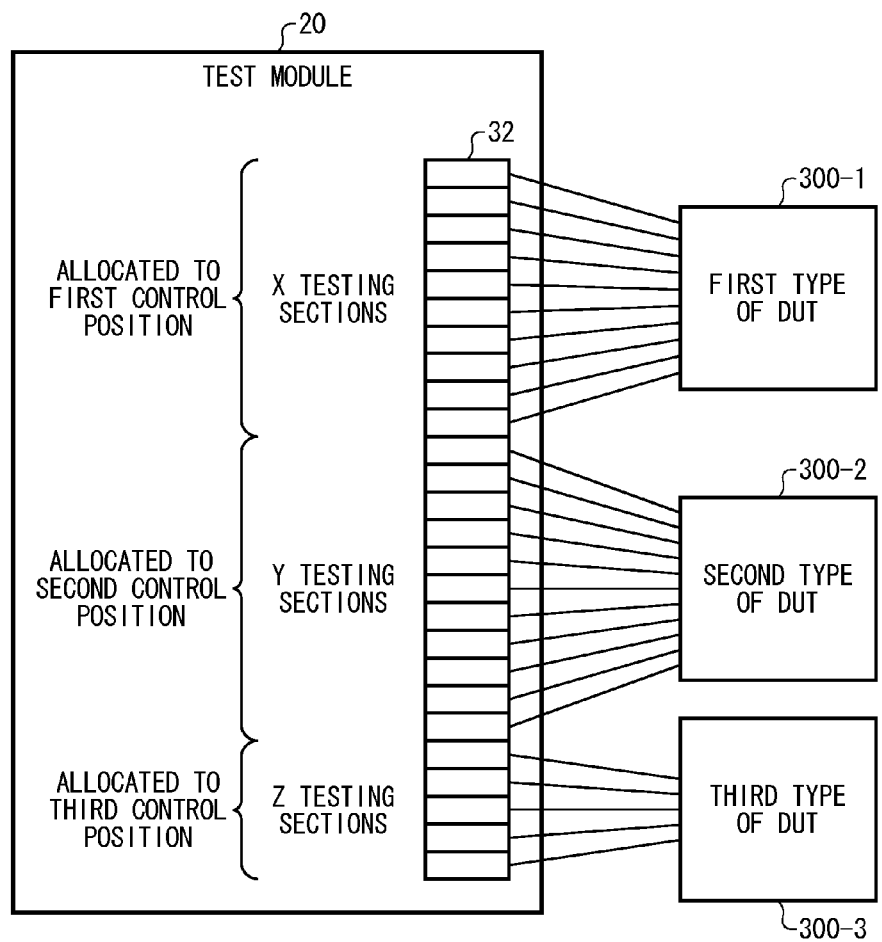
FIG. 6 shows an exemplary assignment of testing sections 32 in a single test module 20 to control apparatuses 18, when three types of DUTs 300 are tested in parallel.

FIG. 6 shows an exemplary assignment of testing sections 32 in a single test module 20 to control apparatuses 18, when three types of DUTs 300 are tested in parallel. Each testing section 32 in a single test module 20 may be assigned to a different control apparatus 18.

In this case, each testing section 32 in a single test module 20 is connected to one of a plurality of types of DUTs 300. As a result, each of the control apparatuses 18 can use each of the testing sections 32 in the same test module 20 as test resources for different DUTs 300.

Figure 7:
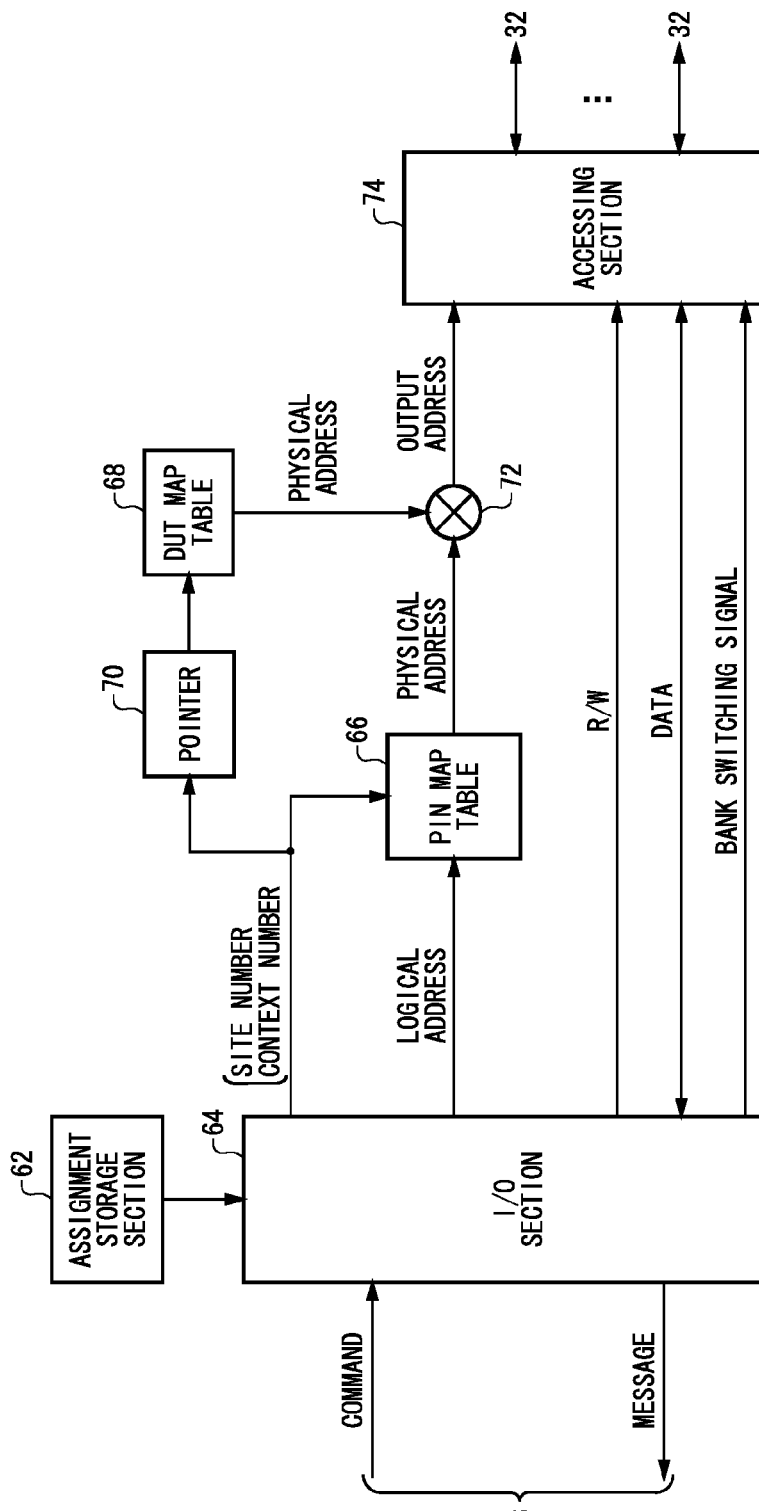
FIG. 7 shows a configuration of an interface section 34 according to the present embodiment.

FIG. 7 shows a configuration of an interface section 34 according to the present embodiment. The interface section 34 includes an assignment storage section 62, an input/output section 64, a pin map table 66, a DUT map table 68, a pointer storage section 70, an AND circuit 72, and an accessing section 74.

The assignment storage section 62 stores identification information indicating sets of a control apparatus 18 and a thread 40 to which the testing sections 32 of the test module 20 are assigned. Prior to execution of the test programs, identification information is written exclusively to the assignment storage section 62 by the corresponding control apparatus 18.

The input/output section 64 receives a command sent from the control apparatus 18. Furthermore, the input/output section 64 transmits, to the corresponding control apparatus 18, a message containing the data read from the testing section 32. The input/output section 64 acquires only the command sent from the control apparatuses 18 and the threads 40 to which the testing sections 32 of the test module are assigned, from among the received commands.

The input/output section 64 supplies the pin map table 66 with the logical address contained in the acquired command. The logical address is an address indicating a terminal of the DUT 300, for example. The input/output section 64 supplies the pin map table 66 and the DUT map table 68 with a site number and a context number contained in the acquired command. The site number distinguishes each control apparatus 18 from the other control apparatuses 18, and the context number distinguishes each thread 40 from the other threads 40. A detailed description of the command content and the processing of the input/output section 64 is provided in relation to FIG. 11.

The pin map table 66 stores a connection relationship between each terminal of the DUT 300 and the testing sections 32 of the test module 20. Upon receiving the logical address, the pin map table 66 references the connection relationship and outputs a physical address that identifies one or more testing sections 32 connected to the terminal of the DUT 300 indicated by the logical address.

The pin map table 66 records the connection relationship, i.e. the type of the connected DUT 300, for each control apparatus 18, and may output a physical address by switching the connection relationship referenced for each control apparatus 18 that receives a command. Furthermore, the pin map table 66 stores the connection relationship for each thread 40, and may output a physical address by switching the connection relationship referenced for each thread 40 that sends a command. The pin map table 66 is described in further detail with reference to FIGS. 12 and 13.

The DUT map table 68 outputs a physical address that identifies the testing sections 32 connected to the terminal of the DUT 300 that is a target for testing, in the DUT 300 connected to the test module 20. For example, the DUT map table 68 may store a plurality of candidates for physical addresses identifying one or more terminals of one or more DUTs 300 (referred to simply as a "DUT map") to be test targets. Each of the candidates in the DUT map stored by the DUT map table 68 corresponds to a set of a site number and a context number. The DUT map table 68 outputs the DUT map corresponding to the set of the site number and the context number contained in the command acquired by the input/output section 64, from among the candidates. More specifically, the DUT map table 68 stores a plurality of candidates for physical addresses that identify testing sections 32 connected to the DUT 300 serving as the test target, and outputs the physical address designated by a pointer stored in the pointer storage section 70. A further description of the DUT map table 68 is provided with reference to FIG. 14.

The pointer storage section 70 stores pointers that designate DUT maps to be output, from among the candidate DUT maps stored by the DUT map table 68. The pointer storage section 70 stores a pointer for each control apparatus 18, i.e. for each type of connected DUT 300, and may switch the pointer and output a DUT map for each control apparatus 18 that has received a command. Furthermore, the pointer storage section 70 stores a pointer for each set of a control apparatus 18 and a thread 40, and may perform output by switching the pointer to the set of a thread 40 and a control apparatus 18 that has received a command, according to the set of a site number and a context number contained in the command. As a result, the pointer storage section 70 can switch to a set of a control apparatus 18 and a thread 40 to output, from the DUT map table 68, a DUT map indicating a terminal of the DUT 300 to serve as a test target. Prior to the execution of the test programs, each pointer is written to the pointer storage section 70 by the corresponding control apparatus 18. Furthermore, prior to the execution of the test programs, information indicating the correspondence between the sets of a site number and a context number and the corresponding pointers (or DUT maps) is written to the pointer storage section 70 from the corresponding control apparatus 18. This information may be set in the control apparatuses 18 by a user, for example.

The AND circuit 72 outputs physical addresses that identify only the testing sections 32 corresponding to terminals designated by the DUT map output from the DUT map table 68, from among the one or more testing sections 32 designated by the physical addresses output from the pin map table 66. More specifically, the AND circuit 72 calculates, for each bit, the AND of the physical addresses output from the pin map table 66, i.e. the physical addresses identifying testing sections 32 connected to terminals that are control targets, and the physical addresses output from the DUT map table 68, i.e. physical addresses indicating testing sections 32 connected to the DUTs 300 that are test targets. In this way, during testing, the AND circuit 72 can output physical addresses indicating testing sections 32 that are to exchange signals with the DUTs 300. Furthermore, the DUT 300 that is a test target can be switched for each thread 40. The AND circuit 72 supplies the accessing section 74 with the calculation results, as an output address. A description of an exemplary process performed by the AND circuit 72 is provided with reference to FIG. 15.

The accessing section 74 accesses the testing section 32 identified by the output address from the AND circuit 72, in response to the command acquired by the input/output section 64. For example, the accessing section 74 may write the data contained in the command acquired by the input/output section 64 to the internal register in the testing section 32 identified by the output address from the AND circuit 72. In this way, a testing section 32 having data written to the internal register therein can perform an operation corresponding to the written data.

When the command acquired by the input/output section 64 is a read command, the accessing section 74 also replies to the testing section 32 designated by the output address from the AND circuit 72. When the acquired command is a read command, the input/output section 64 transmits the message containing the data received from the accessing section 74 back to the control apparatus 18 that sent the command.

The accessing section 74 accesses the memory bank 31 in response to the command acquired by the input/output section 64. For example, the accessing section 74 switches the memory bank 31 that receives the data using a bank switching signal contained in the command acquired by the input/output section 64. As a result, the memory banks 31 can output the data stored therein in an alternating manner.

In the manner described above, the interface section 34 can acquire the commands sent from the control apparatus 18. The interface section 34 can then access the testing section 32 assigned to the thread 40 of the control apparatus 18 that sent the acquired command, according to the acquired command.

The interface section 34 can access testing sections 32 testing one or more devices under test corresponding to sets of a site number and a context number, from among one or more devices under test designated as test targets by the received command, using the DUT map table 68, the pointer storage section 70, and the AND circuit 72. In other words, the interface section 34 masks access to devices under test other than the one or more devices under test corresponding to sets of a site number and a context number, from among one or more devices under test designated as test targets by the received command. The interface section 34 may perform the above operations in both parallel testing and overlapping testing.

FIG. 8 shows exemplary identification information stored in an assignment storage section 62. The assignment storage section 62 may have a plurality of entries storing identification information, for example.

A site number is allocated to each of the control apparatuses 18 to distinguish the control apparatus 18 from other control apparatuses 18. A context number is allocated to each of the threads 40 executed by each control apparatus 18, to identify the thread 40 from other threads 40 within the control apparatus 18.

The identification information is expressed by a set of a site number for identifying a control apparatus 18 and a context number for identifying a thread 40. Each entry of the assignment storage section 62 stores identification information expressed by such a set of a site number and a context number.

Prior to the execution of a thread 40 corresponding to a new test program, each control apparatus 18 writes the identification information, i.e. the set of a site number and a context number, for identifying the control apparatus 18 and the thread 40 to the assignment storage section 62 of each test module 20 having a testing section 32 controlled by the thread 40, i.e. a testing section 32 used as a resource. In this case, each control apparatus 18 sequentially accesses the corresponding assignment storage section 62 from the first entry to find an empty entry, and stores the identification information in the first empty entry found.

Each control apparatus 18 exclusively accesses the corresponding assignment storage section 62, and stores the identification information therein. Furthermore, when the execution of a thread 40 corresponding to a test program is finished, each control apparatus 18 deletes the identification information for identifying this thread 40 and control apparatus 18 from the entry in the assignment storage section 62. As a result, the interface section 34 can prevent the same testing section 32 from being used simultaneously by two or more different threads 40.

Figure 9:
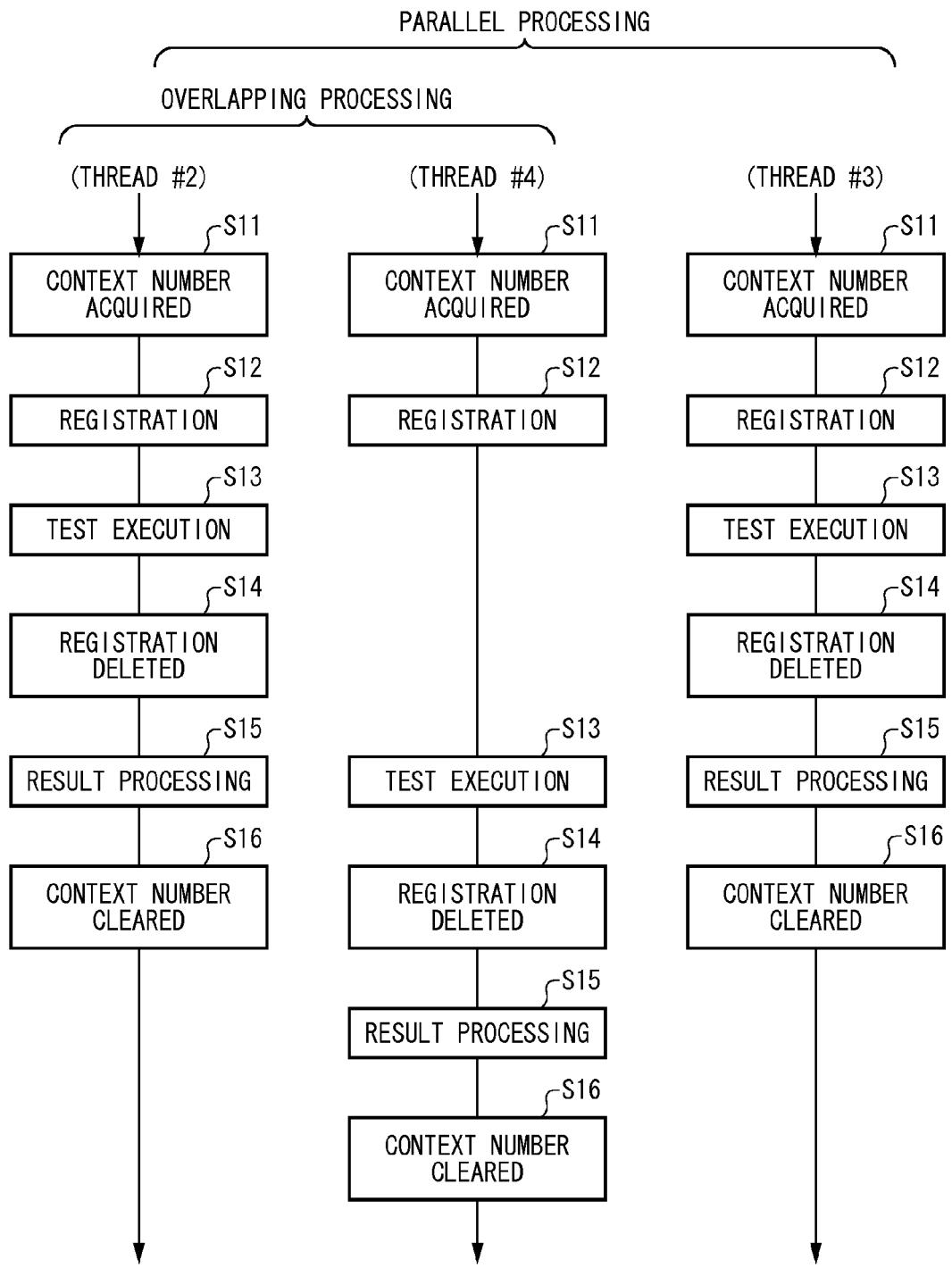
FIG. 9 shows an exemplary operation of a control apparatus 18 when performing parallel testing and overlapping testing.

FIG. 9 shows an exemplary operation of a control apparatus 18 when performing parallel testing and overlapping testing. Parallel testing is described first. This example describes a case in which different testing sections 32 execute threads 40 (#2 and #3) in parallel. Each thread 40 executes the processes of steps S11 to S16 described below. First, at step S11, each thread 40 newly acquires its own context number. In this case, each thread 40 acquires a number that is different from the numbers of other threads 40 within the control apparatus 18.

Next, at step S12, each thread 40 writes its own identification information, i.e. a set of a site number and a context number, to the assignment storage section 62 of the test module 20 included in the testing section 32 to perform access, i.e. the testing section 32 to be used as a resource. In this case, each thread 40 exclusively stores its own identification information at the first empty entry that appears, starting from the first entry in the assignment storage section 62. As a result, each thread 40 can be registered without the same testing section 32 being used by two or more different threads 40.

Next, at step S13, each thread 40 executes the test program. As a result, test programs are executed respectively by the threads 40, and therefore the control apparatus 18 can execute a plurality of test programs in parallel.

When the process of step S13 is finished, at step S14, each thread 40 deletes its own identification information from the assignment storage section 62 of the test module 20 including the testing section 32 used for access. As a result, each thread 40 can free up the testing section 32 used as a resource to be used by another thread 40.

Next, at step S15, each thread 40 processes the test results. Specifically, the test module 20 transmits data to the control apparatus 18, for example.

Next, at step S16, each thread 40 clears the acquired context number. When the process of step S15 is finished, each thread 40 ends the parallel processing. In the manner described above, the control apparatus 18 can execute a plurality of test programs in parallel.

The following describes overlapping processing. This example describes a portion that differs from the parallel processing, in which the same testing section 32 sequentially executes different threads 40 (#2 and #4).

Each thread 40 exclusively stores its own identification information at an empty entry in the assignment storage section 62. It should be noted that the thread 40 (#2) executes the processes of steps S13 and S14 first. Then, after the thread 40 (#2) has finished the processes of steps S13 and S14, the thread 40 (#4) executes the process of step S13. For example, the thread 40 (#4) executes the process of step S13 in parallel with the thread 40 (#2) executing the process of step S15. In this way, each thread 40 can execute the processes such that a portion of the time used for the result processing (S15) of the earlier thread 40 (#2) overlaps with the time used for the test execution (S13) of the subsequent thread 40 (#4).

Figure 10:
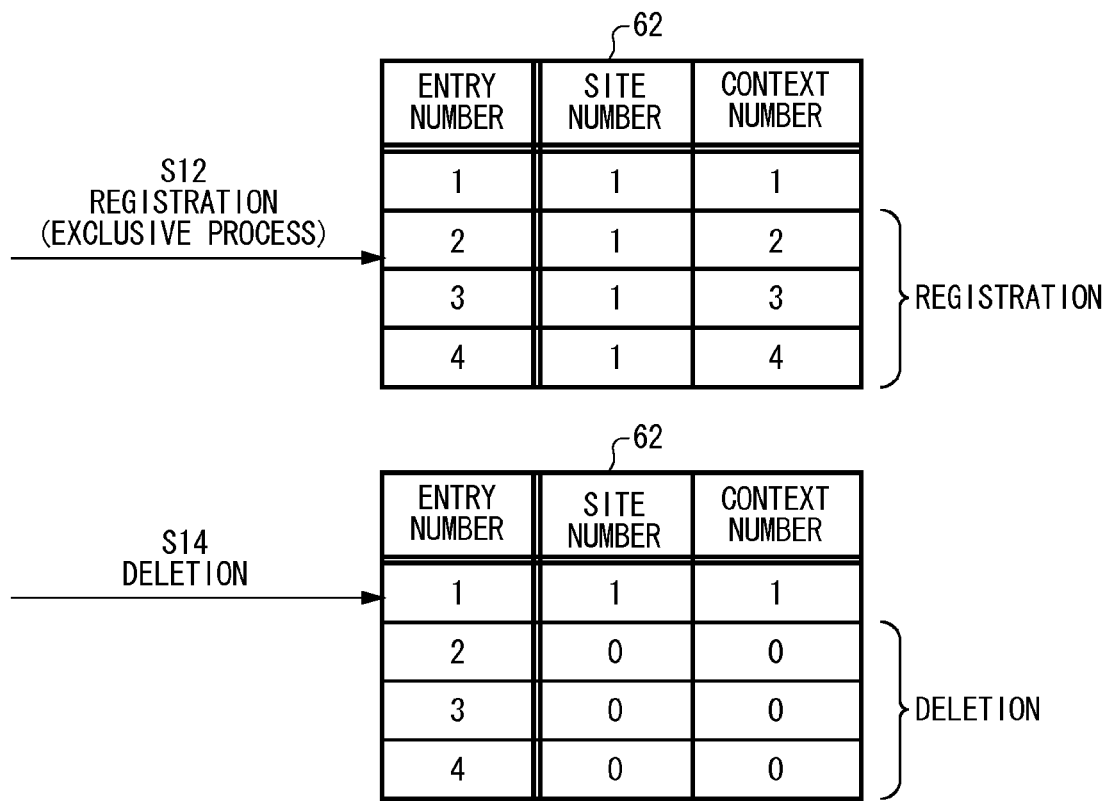
FIG. 10 shows exemplary entries of an assignment storage section 62 at a registration step and a registration deletion step.

FIG. 10 shows exemplary entries of an assignment storage section 62 at a registration step and a registration deletion step. FIG. 10 shows the entries in the registration step of S12 in FIG. 9 and the entries at the deletion step of S14 of the thread 40 (#4). At step S12, each of the threads 40 respectively writes (1, 2) (1, 3) and (1, 4) as a set of (site number, context number) to the corresponding entry of the assignment storage section 62 of the test module 20 including the testing section 32 used for access. At step S14 of each thread 40, the set of (site number, context number) written previously is deleted.

FIG. 11 shows an exemplary format of the command transmitted from the control apparatus 18 to the test module 20. Each control apparatus 18 generates a command with a format such as shown in FIG. 11, and transmits the command to the corresponding test modules 20.

The command may include a site number, a context number, a module number, a R/W flag, a logical address, data, and a bank switching signal, for example. The site number identifies the control apparatus 18 that transmitted the command. The context number identifies the thread 40 that sent the command in the control apparatus 18. The module number identifies the test module 20 that is the transmission source of the command.

The R/W flag identifies whether the command is a read command or a write command. The logical address is information designating locations of one or more terminals of a DUT 300, and indicates the testing sections 32 to be controlled by the command. The data is information such as the commands to be provided to the testing sections 32 connected to the terminals designated by the logical address. This data is written to the internal registers of the testing sections 32 connected to the terminals designated by the logical address. The bank switching signal switches the connections to the memory banks 31. The control apparatus 18 can extract information alternately from memory banks 31 by using the bank switching signal.

The input/output section 64 of each test module 20 receives such a command from a control apparatus 18. When a command is received, the input/output section 64 judges whether the module number contained in the received command matches the module number of the test module 20 that includes this input/output section 64. The input/output section 64 discards the received command if the module numbers do not match.

If the module numbers match, the input/output section 64 judges whether the set of the site number and context number contained in the received command matches one of the pieces of identification information, i.e. one of the sets of a site number and a context number, stored in the entries of the assignment storage section 62. The input/output section 64 discards the received command if the sets of site number and context number do not match.

If the sets of a site number and context number do match, the input/output section 64 acquires the received command. In this way, the input/output section 64 can acquire the command when the command is received from a thread 40 and control apparatus 18 to which are assigned one of the testing sections 32 of the test module 20. In other words, the input/output section 64 can discard the command when the command is received from a control apparatus 18 and thread 40 that are not assigned thereto.

The input/output section 64 supplies the pin map table 66 with the logical address, the site number, and the context number contained in the acquired command. The input/output section 64 supplies the accessing section 74 with the R/W flag. The input/output section 64 supplies the DUT map table 68 with the site number and the context number contained in the acquired command.

Figure 12:
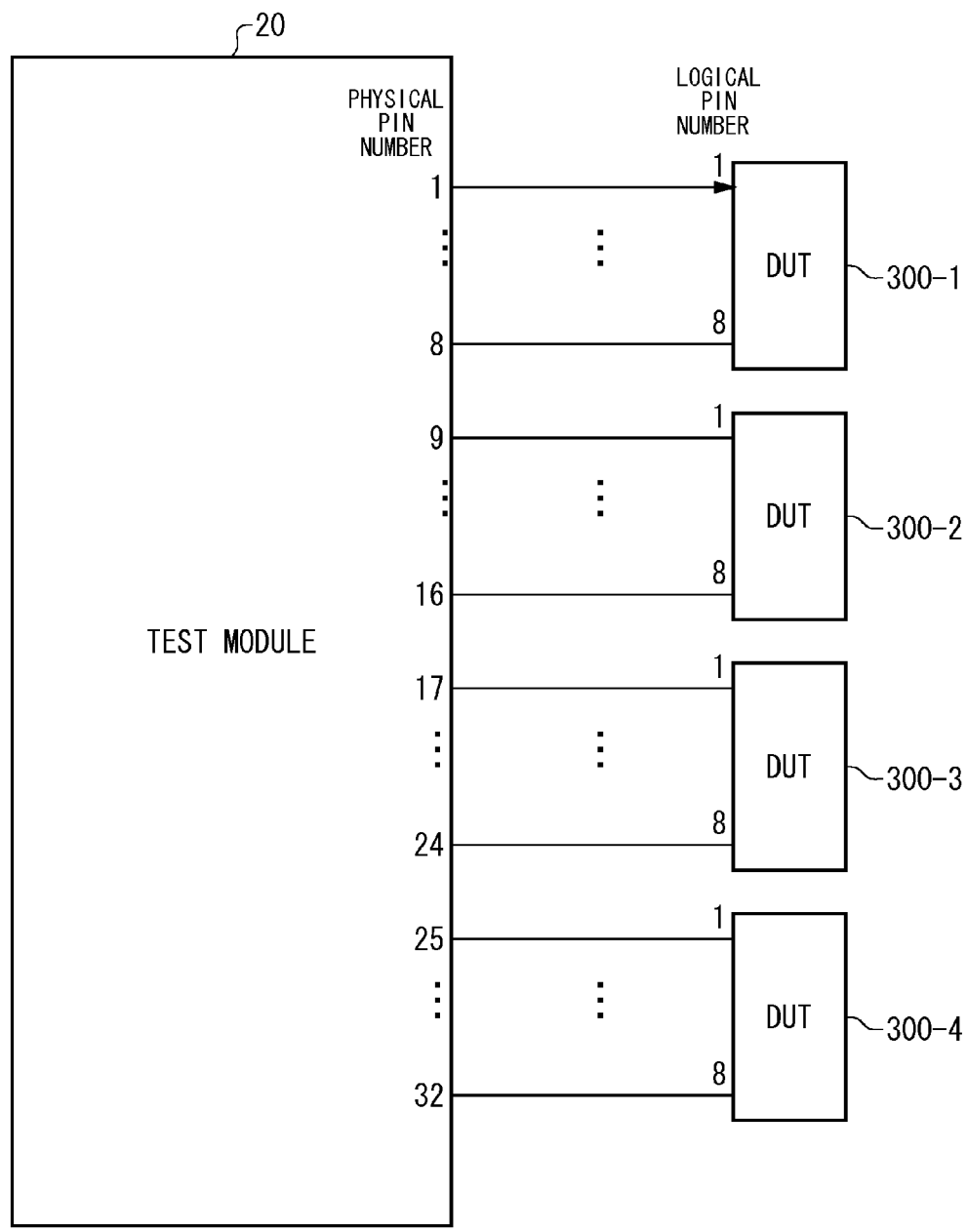
FIG. 12 shows an exemplary connection between a test module 20 and four DUTs 300.

FIG. 12 shows an exemplary connection between a test module 20 and four DUTs 300. In the example shown in FIG. 12, each of the terminals of the DUTs 300 connected to the one test module 20 is connected to a pin corresponding to a different one of the testing sections 32 in the test module 20.

A logic pin number is allocated to each terminal of the DUTs 300. The logic address is information designating one or more of the logic pin numbers.

A physical pin number is allocated to each testing section 32 of the test module 20. The physical address is information designating one or more of the physical pins.

The pin map table 66 stores connection information between the terminals of the DUTs 300 and the testing sections 32 of the test module 20. For example, as shown in FIG. 12, when simultaneously testing four DUTs 300 that each have eight terminals, the pin map table 66 stores information indicating that the first, ninth, seventeenth, and twenty-fifth pins (physical pin number=1, 9, 17, 25) of the test module 20 are connected to the first terminals (logical pin number=1) of the DUTs 300. Furthermore, the pin map table 66 stores information indicating that the second, tenth, eighteenth, and twenty-sixth pins (physical pin number=2, 10, 18, 26) of the test module 20 are connected to the second terminals (logical pin number=2) of the DUTs 300. Similarly, the pin map table 66 stores the connection relationship for the third to eighth terminals of the DUT 300.

Figure 13:
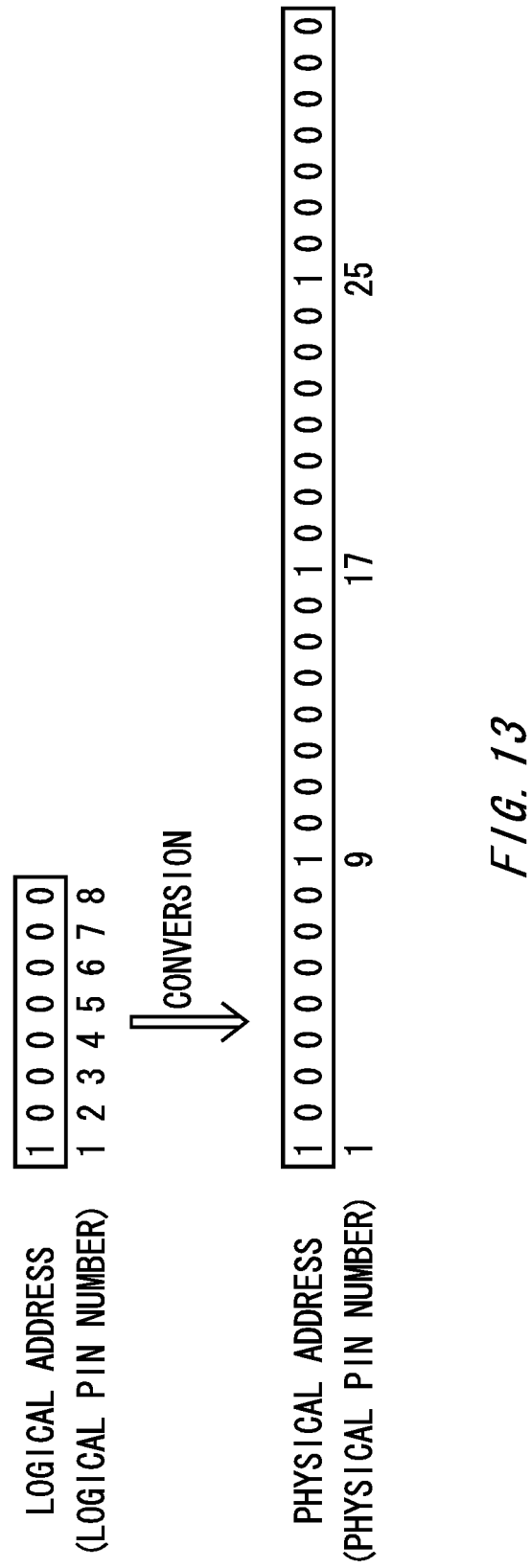
FIG. 13 shows an exemplary conversion from a logical address to a physical address performed by the pin map table 66.

FIG. 13 shows an exemplary conversion from a logical address to a physical address performed by the pin map table 66. Upon receiving the logical address from the input/output section 64, the pin map table 66 references the connection relationship between the testing sections 32 and the terminals of the DUT 300, and converts this logical address into a physical address.

Specifically, in response to receiving a logical address, the pin map table 66 outputs a physical address identifying one or more testing sections 32 that are connected to the terminal of the DUT 300 identified by the logical address. As a result, the pin map table 66 can output a physical address identifying testing sections 32 connected to a terminal designated as a control target by the acquired command.

For example, as shown in FIG. 13, it may be assumed that the pin map table 66 receives a logical address identifying the first terminal of the DUT 300. In this case, the DUT map table 68 converts the received logical address into a physical address identifying all of the testing sections 32 connected to the first terminal among the plurality of DUTs 300, and outputs this physical address.

In the connection example shown in FIG. 12, when a logical address identifying the first terminal of a DUT 300 is received, the pin map table 66 outputs a physical address identifying the first, ninth, seventeenth, and twenty-fifth pins (physical pin number=1, 9, 17, 25) of the test module 20 connected to the first terminals of the DUTs 300.

The pin map table 66 may switch the referenced connection relationship for each thread 40 and each control apparatus 18, i.e. for each type of connected DUT 300. In other words, the pin map table 66 may switch the referenced connection relationship according to the site number and context number supplied from the input/output section 64, and output the corresponding physical address.

FIG. 14 shows exemplary candidates for a physical address identifying DUTs 300 to be test targets, stored in the DUT map table 68. The DUT map table 68 outputs a physical address identifying the testing sections 32 connected to one or more DUTs 300 that are to be test targets, from among the DUTs 300 connected to the test module 20.

In the example of FIG. 14, the DUT map table 68 stores candidates for four physical addresses. More specifically, in this case, the DUT map table 68 stores candidates for a physical address in a case where the first DUT 300 among the four DUTs 300 is the test target, a physical address in a case where the second DUT 300 among the four DUTs 300 is the test target, a physical address in a case where the first and third DUTs 300 among the four DUTs 300 are the test target, and a physical address in a case where all of the four DUTs 300 are the test target.

The DUT map table 68 outputs one physical address designated by a pointer stored in the pointer storage section 70, from among the stored candidate physical addresses, as the physical address identifying the testing sections 32 connected to the DUTs 300 to be test targets. Prior to the execution of the test programs, the control apparatus 18 selects the DUTs 300 to be test targets, and writes the pointer in the pointer storage section 70 to set the selected DUTs 300 as test targets. As a result, the DUT map table 68 can output a physical address identifying the DUTs 300 to be test targets of the test programs.

The pointer storage section 70 stores a pointer for each thread 40 and each control apparatus 18. The pointer storage section 70 switches the pointer according to the site number and context number supplied from the input/output section 64, and outputs the corresponding information. As a result, the DUT map table 68 can switch the DUTs 300 to be test targets for each thread 40 and each control apparatus 18, i.e. each type of connected DUT 300.

Figure 15:
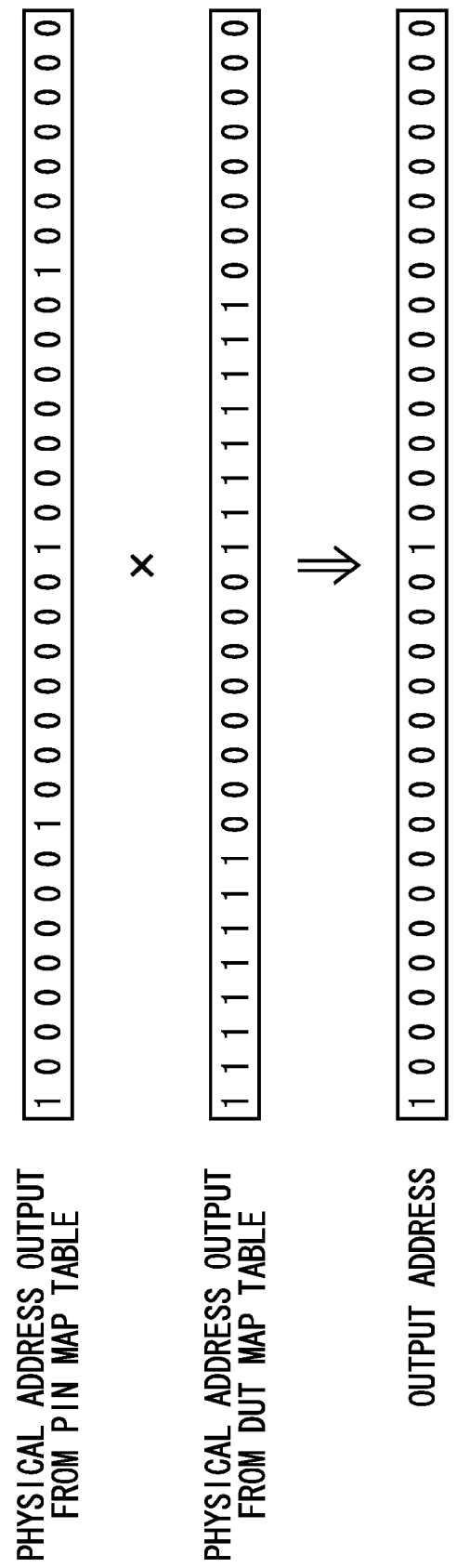
FIG. 15 shows an exemplary process performed by the AND circuit 72.

FIG. 15 shows an exemplary process performed by the AND circuit 72. The AND circuit 72 calculates, for each corresponding bit, the AND of the physical address output from the pin map table 66, i.e. the physical address identifying testing sections 32 connected to the terminals that are control targets, and the physical address output from the DUT map table 68, i.e. the physical address identifying testing sections 32 connected to the DUTs 300 that are test targets.

For example, as shown in FIG. 15, when four DUTs 300 that each have eight terminals are tested simultaneously, the AND circuit 72 receives from the pin map table 66 the physical address identifying the first terminals of all four DUTs 300. Furthermore, in this case, the AND circuit 72 receives from the DUT map table 68 the physical address designating the first and third DUTs 300 among the four DUTs 300.

In this case, the AND circuit 72 calculates the AND of each bit for these two physical addresses, and outputs an output address that designates the first terminal of the first DUT 300 and the first terminal of the third DUT 300. In this way, during testing, the AND circuit 72 can supply the accessing section 74 with a physical address indicating the testing sections 32 that are to exchange signals with the DUTs 300.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A test apparatus that tests a device under test, comprising:
   a control apparatus that sequentially executes a plurality of test programs and controls testing of the device under test; and
   a test module that is controlled by the control apparatus to test the device under test by communicating with the device under test and to transmit a test result of each test program to the control apparatus, wherein
   the test module includes a plurality of memories that store the test results of the test programs, and starts a subsequent test of the device under test such that at least a portion of a result processing time period of a current test of the device under test, which is from when a test result of the current test stored in a first memory begins to be transmitted to the control apparatus to when processing of the test result of the current test by the control apparatus is finished, overlaps with at least a portion of a test execution period of the subsequent test, which is from when the subsequent test is begun to when a test result of the subsequent test is stored in a second memory.

2. The test apparatus according to claim 1, wherein the test module starts executing the subsequent test using the second memory at a timing at which the test execution time period of a test using the first memory is finished.

3. The test apparatus according to claim 2, wherein the test module starts the execution of the subsequent test using the second memory in parallel with starting transmission of the test result stored in the first memory to the control apparatus.

4. The test apparatus according to claim 1, wherein the test module stores the test results corresponding to the sequentially executed test programs alternately between the first memory and the second memory for each test program.

5. The test apparatus according to claim 1, wherein the test module includes a plurality of testing sections that test the device under test by communicating with the device under test, and
   each testing section is connected to two memories.

6. The test apparatus according to claim 5, wherein
one of the testing sections executing a corresponding test is assigned to each test program.

7. The test apparatus according to claim 6, wherein
the control apparatus further includes a function to execute a plurality of test programs for testing the device under test in parallel and, when a plurality of the test programs are executed in parallel, controls the operations of the testing sections assigned to the plurality of the test programs in parallel.

8. The test apparatus according to claim 7, wherein
the control apparatus executes a plurality of threads corresponding respectively to the plurality of test programs,
each testing section is assigned to one of the threads,
the control apparatus transmits, to the test module, commands respectively generated according to the threads, and
the test module further includes an interface section that, in response to a command received from the control apparatus, accesses the one of the testing sections to which is assigned the thread that generated the command.

9. The test apparatus according to claim 8, wherein
the interface section further includes an assignment storage section that stores identification information indicating the threads assigned to the testing sections of the test module.

10. A test module for use in a test apparatus that tests a device under test, the test module comprising:
a plurality of memories that store test results of test programs sequentially executed by a control apparatus of the test apparatus, wherein
the test module is controlled by the control apparatus to test the device under test by communicating with the device under test and to transmit a test result of each test program to the control apparatus, and
the test module starts a subsequent test of the device under test such that at least a portion of a result processing time period of a current test of the device under test, which is from when a test result of the current test stored in a first memory begins to be transmitted to the control apparatus to when processing of the test result of the current test by the control apparatus is finished, overlaps with at least a portion of a test execution period of the subsequent test, which is from when the subsequent test is begun to when a test result of the subsequent test is stored in a second memory.

11. The test module according to claim 10, wherein
the test module starts executing the subsequent test using the second memory at a timing at which the test execution time period of a test using the first memory is finished.

12. The test module according to claim 11, wherein
the test module starts the execution of the subsequent test using the second memory in parallel with starting transmission of the test result stored in the first memory to the control apparatus.

13. The test module according to claim 10, wherein
the test module stores the test results corresponding to the sequentially executed test programs alternately between the first memory and the second memory for each test program.

14. The test module according to claim 10, further comprising a plurality of testing sections that test the device under test by communicating with the device under test, wherein
each testing section is connected to two memories.

15. The test module according to claim 14, wherein
one of the testing sections executing a corresponding test is assigned to each test program,
the control apparatus further includes a function to execute a plurality of test programs for testing the device under test in parallel and, when a plurality of the test programs are executed in parallel, controls the operations of the testing sections assigned to the plurality of the test programs in parallel,
the control apparatus executes a plurality of threads corresponding respectively to the plurality of test programs,
each testing section is assigned to one of the threads,
the control apparatus transmits, to the test module, commands respectively generated according to the threads, and
the test module further comprises an interface section that, in response to a command received from the control apparatus, accesses the one of the testing sections to which is assigned the thread that generated the command.

16. The test module according to claim 15, wherein
the interface section further includes an assignment storage section that stores identification information indicating the threads assigned to the testing sections of the test module.

* * * * *